United States Patent

Casperson et al.

[11] Patent Number: 4,779,654
[45] Date of Patent: Oct. 25, 1988

[54] TREE HARVESTING

[76] Inventors: Donald L. Casperson, 4243 13.75 Rd., Escanaba, Mich. 49829; Duane L. Scheuren, 6246 F La., Bark River, Mich. 49807

[21] Appl. No.: 76,546

[22] Filed: Jul. 22, 1987

[51] Int. Cl.$^4$ ............................................. A01G 23/08
[52] U.S. Cl. ..................... 144/338; 144/2 Z; 144/3 D; 144/343
[58] Field of Search ............ 144/2 N, 2 Z, 3 D, 34 R, 144/335, 338, 343

[56] References Cited

U.S. PATENT DOCUMENTS

| | | |
|---|---|---|
| 3,542,009 | 11/1970 | Gibson . |
| 3,590,760 | 7/1971 | Boyd et al. . |
| 3,796,241 | 3/1974 | Golob et al. . |
| 3,882,910 | 5/1975 | Peltola et al. . |
| 3,905,407 | 9/1975 | Guy et al. . |
| 3,981,336 | 9/1976 | Levesque . |
| 3,986,542 | 9/1976 | Guy et al. . |
| 3,999,582 | 12/1976 | Allen et al. ................. 144/2 Z |
| 4,044,806 | 8/1977 | Savage et al. . |
| 4,081,007 | 3/1978 | Loigerot . |
| 4,109,689 | 8/1978 | Castine . |
| 4,116,249 | 9/1978 | Hogberg et al. . |
| 4,537,236 | 8/1985 | Kulju . |
| 4,552,191 | 11/1985 | Kuusilinna . |
| 4,569,379 | 2/1986 | Gemmell-Murdoch ............ 144/2 Z |

Primary Examiner—W. Donald Bray
Attorney, Agent, or Firm—Andrus, Sceales, Starke & Sawall

[57] ABSTRACT

A tree harvester (3) is mounted on the front end of a steerable self-propelled vehicle (2) in line with the vehicle's longitudinal axis (8). The harvester frame (11) is pivotable about a longitudinal axis (13). A telescoping boom (15) having a plurality of grab jaws (24, 25) at one end is mounted on the frame for pivoting between a vertical and horizontal transverse position. Delimbing jaws (30, 31) are fixedly mounted to the frame. When the boom is vertical and retracted, the jaws are in line and form a pocket (36) which faces transversely so that the harvester can be steered sideways into the tree for grabbing and cutting off ahead of the vehicle. The harvester is then pivoted so that the boom and cut tree are disposed horizontally transversely and above the ground ahead of one side of the device. The boom is then extended so that the grab jaws thereon pull the cut tree trunk through the delimbing jaws. The delimbing jaws are provided with fore and aft cutting edges (51, 52) so that a secondary delimbing operation may be performed by retracting the boom with the cut tree trunk still intact. The felled and delimbed trunk is cut into uniform lengths on one side of the device by a saw (39) disposed in a protective housing adjacent the delimber jaws.

17 Claims, 4 Drawing Sheets

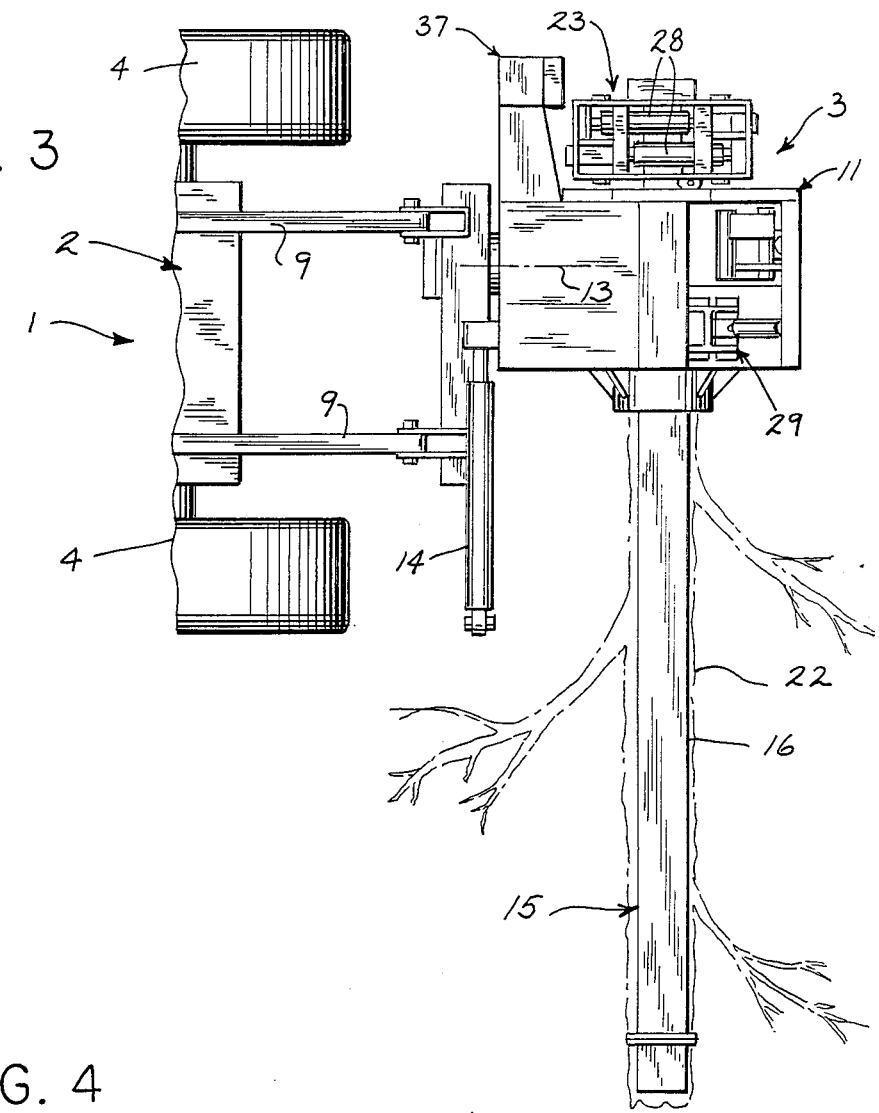
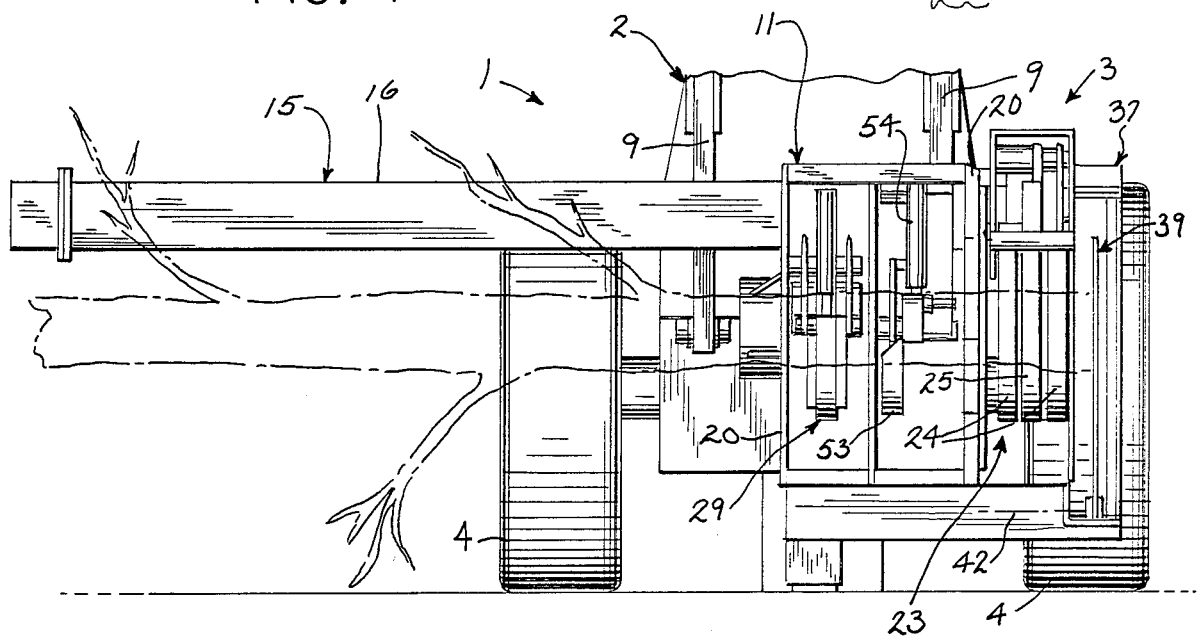

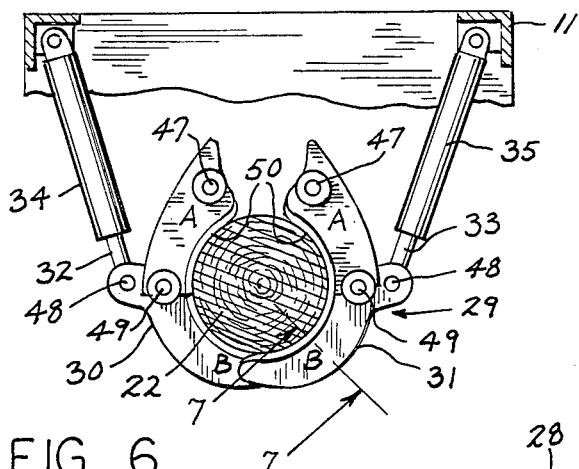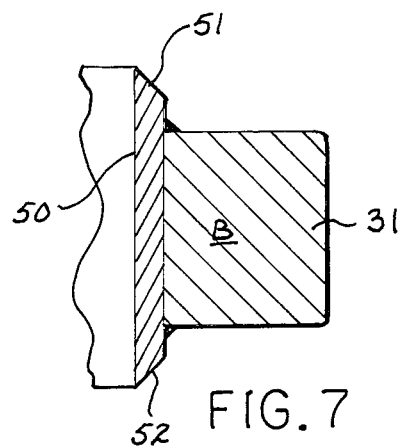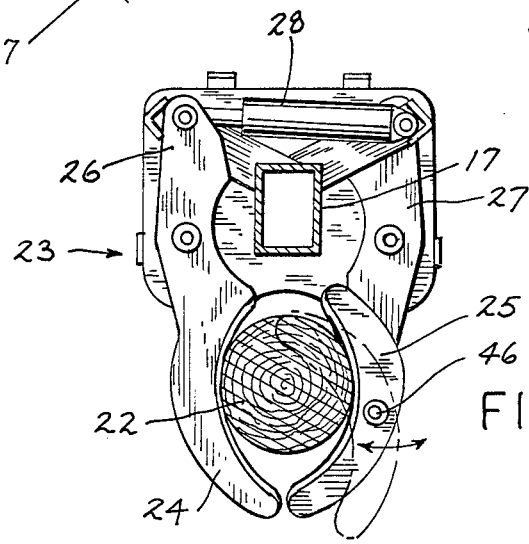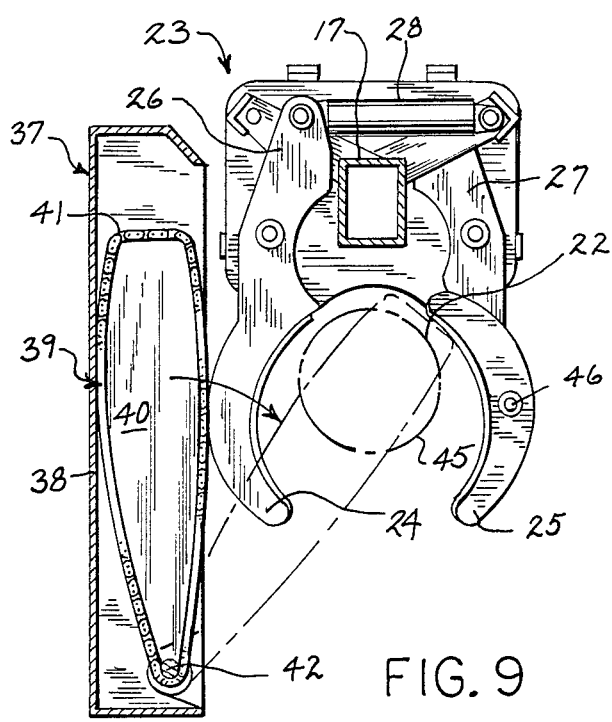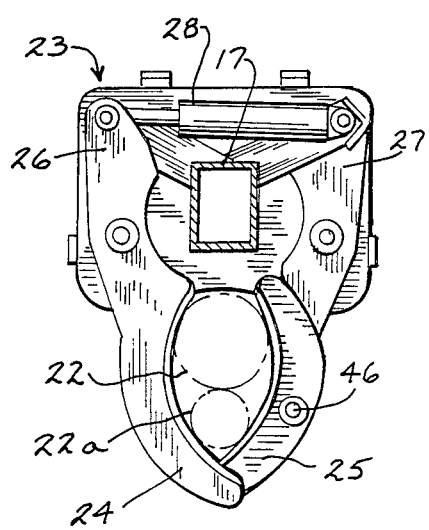

TREE HARVESTING

BACKGROUND AND SUMMARY OF THE INVENTION

This invention relates to tree harvesting, and more particularly to harvesting by means of an attachment to a self-propelled steerable vehicle adapted to travel through a wooded area for harvesting selected trees.

Numerous methods and devices for tree harvesting have been previously proposed. See for example the patents identified in the accompanying "Information Disclosure Statement".

The previous concepts have included gripping a vertical tree, holding it in place, shearing it off, lowering the tree to the ground, and subsequently delimbing and cutting manually or with a separate mechanism. This procedure requires extra labor, and it is difficult to cut the delimbed tree to a reasonably uniform length. Furthermore, the tree segments end up being buried in the delimbed brush which has been removed.

Other concepts have included coming into the growing tree from the front—that is, in a direction parallel to the longitudinal vehicle axis. The tree is often then tipped and felled forwardly, thus requiring the harvester to be driven to a second location adjacent the felled tree for further operations. The closeness of adjacent growing trees in the woods may make this difficult or even impossible. U.S. Pat. No. 3,796,241 discloses a device wherein the harvester comes into the tree from the side (i.e. transverse to the vehicle's longitudinal axis), but the arrangement is such that the tree to be cut is alongside the vehicle and after the tree is cut, it must be swung into a position along the vehicle's longitudinal axis. This is cumbersome at best.

Prior shearing devices, such as chain saws, for cutting the felled tree into lengths have usually been normally positioned, when retracted, so that they will get entangled in the brush being delimbed from the trunk. Many such shearing devices cut the tree into lengths by cutting straight down vertically, with the result that the bottom edge of the trunk segment being cut will tear away as the segment is about to drop. Others, such as in U.S. Pat. Nos. 3,882,910 and 4,552,191 swing relative to the tree from a pivot disposed at a level either above the delimbing jaws or at least above the jaw openings.

Furthermore, the tree-holding jaws on many prior devices are designed to accommodate only one tree at a time. In addition, prior known delimbing jaws are able to delimb only in one direction of trunk movement.

It is an object of the present invention to provide improved concepts for harvesting trees.

In accordance with the various aspects of the invention, a tree harvester is adapted to be mounted on the front end of a steerable self-propelled vehicle, generally in line with the vehicle's longitudinal axis. The harvester includes a frame pivotable about a longitudinal axis. A telescoping boom having grab jaws at one end is mounted on the frame for pivoting between a vertical and horizontal transverse position. Delimbing jaws are fixedly mounted to the frame. When the boom is vertical and retracted, both types of jaws are in line and form a pocket which faces transversely of the vehicle and harvester axis so that the harvester can be easily steered sideways into the tree for grabbing and cutting off ahead of the vehicle. The harvester is then pivoted so that the boom and cut tree are disposed horizontally transversely and above the ground ahead of one side of the device. The boom is then extended so that the grab jaws thereon pull the cut tree trunk through the delimbing jaws. The delimbing jaws are provided with fore and aft cutting edges so that a secondary delimbing operation may be performed by retracting the boom with the cut tree trunk still intact.

The felled and delimbed trunk is cut into uniform lengths on one side of the device by a saw disposed in a protective housing adjacent the delimber jaws. The brush drops to the other side. During delimbing, the saw is normally vertical and is pivotally mounted at its lower end at a level below both sets of jaws and the tree-receiving pocket. During cutting of the trunk into lengths, the saw pivots downwardly in an arc such that the side, rather than the bottom, of the trunk is the last portion to be cut, thus preventing tearing of the cut segment before it falls to the ground.

One side of the plurality of grab jaws is center-pivoted and is rockable to efficiently accommodate more than one tree trunk at a time. An accumulator finger may also assist in this regard.

BRIEF DESCRIPTION OF THE DRAWINGS

The accompanying drawings illustrate the best mode presently contemplated by the inventors for carrying out the invention.

In the drawings:

FIG. 3 is a plan view showing the device and cut tree rotated to horizontal transverse position;

FIG. 4 is a front end elevation of the rotated device taken from the right of FIG. 3;

FIG. 6 is an enlarged view of the delimbing jaws taken on line 6—6 of FIG. 5;

FIG. 7 is an enlarged transverse section taken on line 7—7 of FIG. 6;

FIG. 8 is a view of the grab jaws, taken on line 8—8 of FIG. 5;

FIG. 9 is a view of the cutting saw and grab jaws taken on line 9—9 of FIG. 5; and FIG. 10 is a further view of the grab jaws, illustrating the handling of more than one tree at a time.

DESCRIPTION OF THE PREFERRED EMBODIMENT

Figure 1:
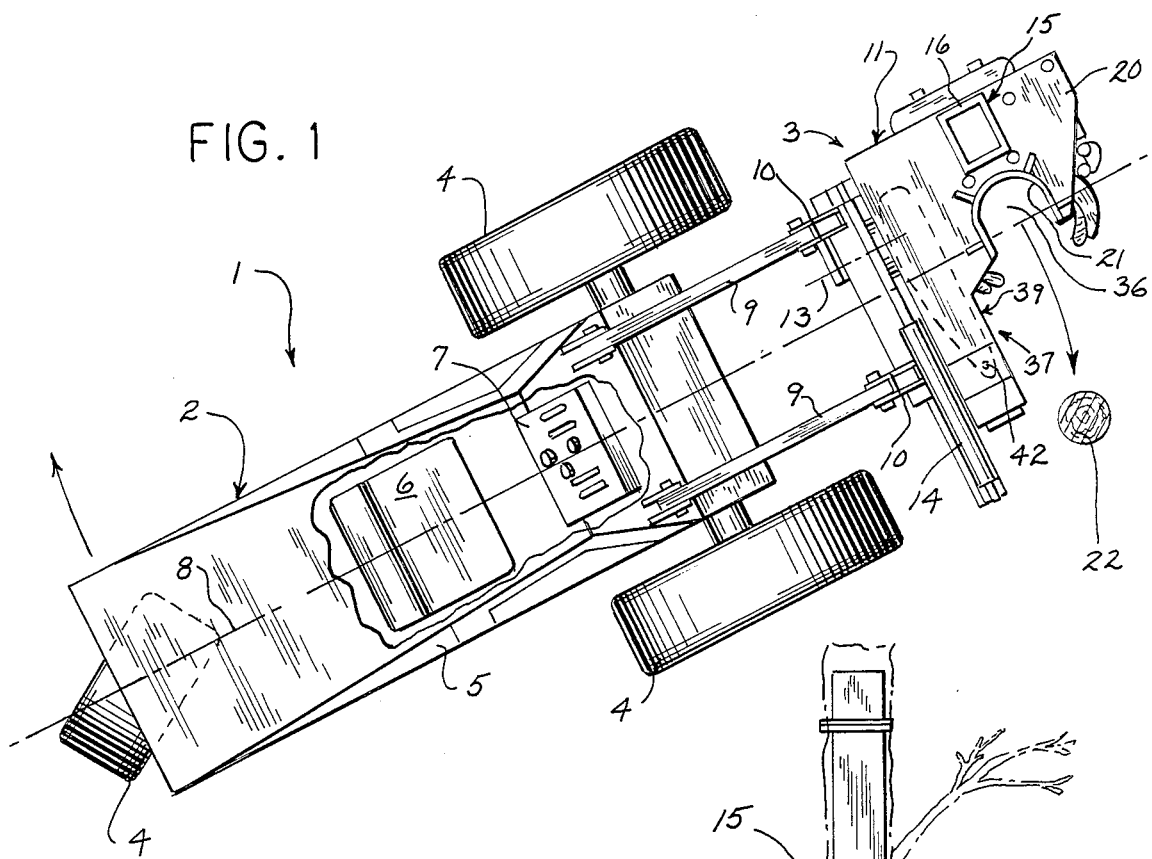
FIG. 1 is a generally schematic top plan view of a vehicle mounted tree harvester constructed in accordance with the aspects of the invention.

As best shown in FIG. 1, the concepts of the invention are adapted to be embodied in logging equipment 1 including a steerable self-propelled vehicle 2 to which is forwardly attached a tree harvester 3. Vehicle 2 includes the usal wheels 4, with the rear wheel of the present embodiment being steerable. An operator's cab 5 is mounted on vehicle 2 and includes a seat 6 and a control panel 7 which is adapted to be connected through electrical, mechanical and hydraulic controls (not shown) to harvester 3 in any usual well-known manner to operate the various components thereof as desired. Vehicle 2 and harvester 3 define a common longitudinal axis 8.

Harvester 3 is mounted at the front of vehicle 2 in any suitable manner, such as by transversely spaced generally parallel mounting struts 9 which are pivoted at their rear ends to the vehicle frame and at their front ends to brackets 10 secured to the frame 11 of harvester 3. Suitable controllable lift cylinders 12 are adapted to raise and lower the harvester relative to the vehicle.

Means are provided to selectively pivot harvester frame 11 relative to vehicle 2 about a horizontal longitudinal pivot axis 13. For this purpose, and as best shown in FIGS. 1-3, a controllable pivot cylinder 14 is connected between struts 9 and frame 11.

For purposes of manipulating a tree, an elongated telescoping boom 15 is suitably mounted to and extends through harvester frame 11. Boom 15 is shown as being generally rectangular and includes an outer member 16 which is rigidly secured to frame 11 and an inner member 17 which slideably extends outwardly of and retracts within outer member 16. The motive means for operating boom 15 is schematically shown in FIG. 5A and includes a controllable hydraulic cylinder 18 attached at one end to outer boom member 16, with a piston rod 19 attached at its outer end to inner boom member 17. The arrangement is such that piston rod 19 normally has a fixed stroke.

Figure 2:
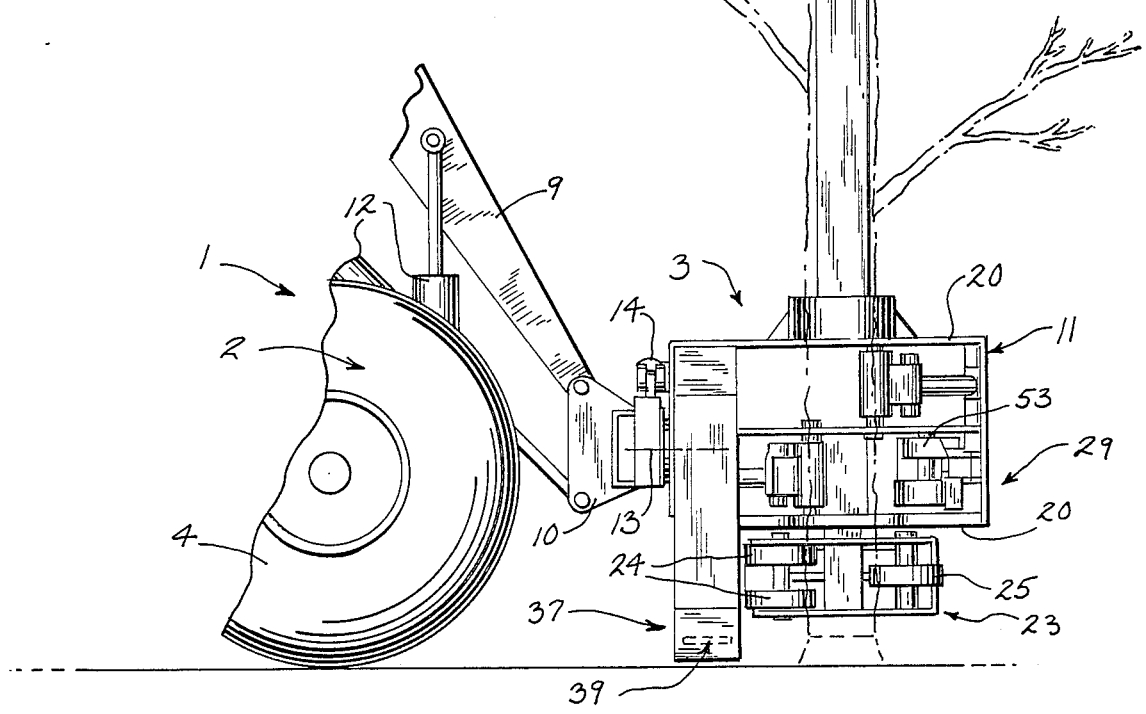
FIG. 2 is a side elevation of the device at the time of cutting the growing tree.

When viewed from the side, as in FIG. 2, harvester frame 11 includes a pair of suitably joined spaced upper and lower plates 20 which are provided with aligned recesses 21. See FIG. 1.

In accordance with the inventive aspects, jaw means are provided for engaging and steadying a tree 22 during harvesting. For this purpose, a grab jaw assembly 23 is mounted on the outer end of boom member 17 and, as best shown in FIGS. 8 and 9, includes a pair of grab jaws 24 and an opposite grab jaw 25 which are suitably actuated via respective linkages 26 and 27 from controllable hydraulic cylinders 28. Grab jaws 24 and 25 are adapted to receive and hold a tree 22 therein, with the open jaw ends extending outwardly of frame recesses 21.

Likewise a delimber jaw assembly 29 is fixedly mounted within harvester frame 11 and, as best shown in FIG. 6, includes a pair of delimbing jaws 30 and 31 which are actuated via respective piston rods 32 and 33 from respective controllable hydraulic cylinders 34 and 35. Delimbing jaws 30 and 31 likewise are adapted to receive and hold a tree 22 therein, with the open jaw ends extending outwardly of frame recess 21.

The construction is such that recesses 21, grab jaws 24 and 25, as well as delimbing jaws 30 and 31 are in generally mutual axial alignment and form a tree-receiving pocket 36. See FIG. 1. When harvester 3 is in initial tree cutting position, as in FIGS. 1 and 2, pocket 36 faces transversely of longitudinal axis 8.

The inventive aspects further include cutoff means provided adjacent grab jaw assembly 23 for purposes of not only cutting the growing tree 22 from its base, but also to slice the horizontally pivoted tree trunk into segments of approximately equal length. For this purpose, and referring to FIGS. 1, 4, 5 and 9, a saw assembly 37 is mounted to frame 11 and is spaced outwardly of delimber jaw assembly 29. Saw assembly 37 comprises an open sided housing 38 within which is protectively mounted an elongated chain saw 39. Saw 39 includes a blade 40 and peripheral chain 41 which is driven in any suitable manner. One end of blade 40 is mounted for pivoting movement about an axis 42. Axis 42 is disposed outwardly of a segment of pocket 36.

When harvester frame 11 is in the pivoted delimbing position, as in FIG. 9, axis 42 is disposed vertically at a level below pocket 36, and saw 39 normally extends upwardly therefrom within housing 38. Saw 39 is reciprocably pivoted outwardly of housing 38 and into and out of cutting contact with a tree trunk 22 by any suitable controllable drive means. The construction is such that when grab jaw assembly 23 is retracted, saw 39 will be disposed outwardly thereof, as seen in FIG. 2.

General Operation

Vehicle 2 is driven into a forest or other suitable place, with harvester 3 attached forwardly thereof. When a certain tree is to be felled, and as best shown in FIG. 1, frame 11 is pivoted to a first or tree pickup position, the vehicle is steered so that pocket 36 is up to and adjacent the side of tree 22, and then further steering transversely of longitudinal axis 8 swings pocket 36 sideways into enveloping relationship with the tree and ahead of the vehicle. The vertical tree trunk is then grasped by the respective jaws of grab jaw assembly 23 on the retracted vertical boom 15 and by delimber jaw assembly 29, as in FIG. 2. Saw 39, which is below grab jaw assembly 23, is then pivoted outwardly from housing 38 and serves to sever the tree from its base forwardly of vehicle 2. The saw then retracts into its housing. Since assemblies 23 and 29 are vertically spaced along boom 15, the tree is held firmly and will not fall.

Next, harvester frame 3 is pivoted to bring the cut tree 22 as well as boom 15 into a horizontal tree processing position above and parallel to the ground and extending transversely to one side of the equipment, as in FIGS. 3 and 4.

Figure 5:
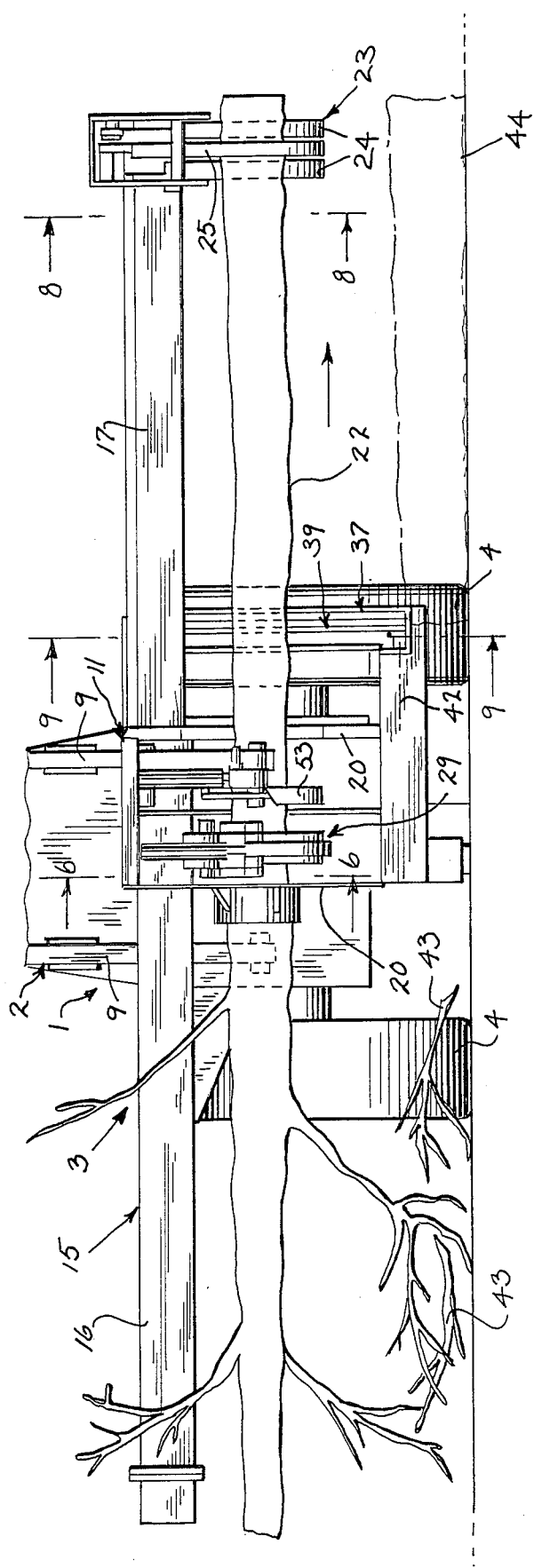
FIG. 5 is a view generally similar to FIG. 4 with the telescoping boom extended during delimbing.
Figure 5A:
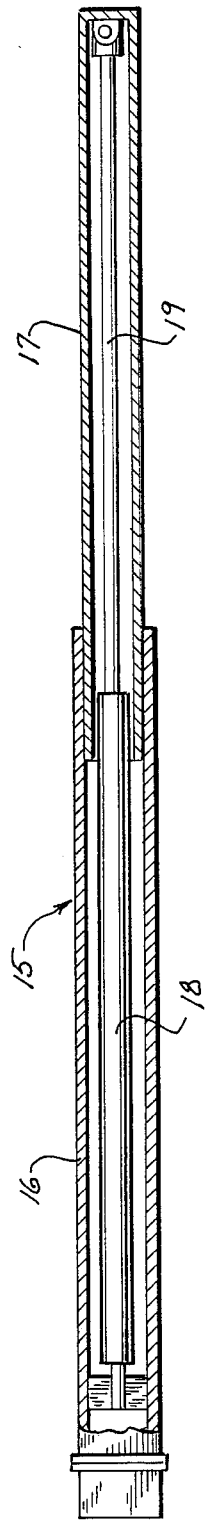
FIG. 5A is a fragmentary showing of the boom telescoping apparatus.

Boom 15 is then telescopingly extended, as shown in FIG. 5, so that grab jaw assembly 23 pulls the tree trunk through delimber jaw assembly 29 on the harvester frame 11. The jaws of delimber jaw assembly 29 are provided with stripping blades, as will be described more fully hereinafter, which strip and remove small branches 43 from the tree trunk, which fall to the ground and form a pile of brush on the side of the equipment transversely opposite outer boom member 16. As soon as inner boom member 17 and the accompanying grab jaw assembly 23 complete their outward stroke and delimbing is completed, saw 39 is again actuated, this time generally vertically as in FIG. 9, to sever a log segment 44 of the tree adjacent delimber jaw assembly 29 so that it falls to the ground, as shown in FIG. 5. This, of course, is accompanied by an opening of grab jaws 24 and 25 to release the segment. Boom 15 is then retracted so that grab jaw assembly 23 moves to inwardly of saw assembly 37. Assembly 23 the grabs the remaining forward tree end, at which time the delimbing cycle is repeated. Continuous repetition of the cycle ultimately forms a transverse pile of cut tree trunk log segments of substantially uniform length.

It should be noted that during the delimbing operation the brush falls to one side of harvester 3 and the cut trunk segments fall to the other side, all ahead of vehicle 2 and extending transversely. This makes it relatively easy for the vehicle to ultimately back away from the area without interference by the piles of debris and logs on the grounds.

Further Aspects

As best seen in FIG. 9, the pivot axis 42 for saw 39 is disposed such that when harvester frame 3 is in its horizontal delimbing position, the said pivot axis is disposed at a level below both sets of jaws 24, 25 and 30, 31 as well as below pocket 36. In addition, the external contour of saw blade 40 is generally whale-shaped. When saw 39 is pivoted inwardly in an arc, as shown in phantom in FIG. 9, the trunk of tree 22 is cut from upper left to lower right. The lower right segment 45 (between the 3 o'clock and 6 o'clock positions) of tree 22 is the last to be cut. Segment 45 provides an elongated arcuate portion which extends generally vertically on the side of the tree. Thus, as the final cut of the tree body is made, segment 45 will support the tree body and prevent tearing away of the about-to-fall log, as would be the case if a straight vertical cut was made.

In addition, grab jaw assembly 23 is constructed so that it can easily accommodate more than one tree at a time in a desired sequence of dual-tree pickup. See trees 22 and 22a in FIG. 10. For this purpose, each grab jaw 24 is fixedly connected to a link 26, while grab jaw 25 is freely rockingly pivoted about its center to an extension of its respective link 27 on a pivot axis 46. See also FIG. 8. This permits jaw 25 to automatically grasp, in an equalized manner, a tree of varying size diameters, or multiple trees.

It should also be noted from FIG. 6 that the pair of delimber jaws 30 and 31 are double jointed with their upper portions A being fixedly pivoted to harvester frame 11 on pivot axes 47. Jaw lower portions B are pivotally mounted to piston rods 33, as at 48, and furthermore pivotally float on portions A, as on pivot axes 49. This permits tighter accommodation to trees 22 of widely varying trunk diameters.

In some instances, a single outward pass of a tree 22 through delimber assembly 29 may not sufficiently remove all of the limbs from the trunk. One way to solve this would be to temporarily deactivate saw 39, retract grab jaw assembly 23 with the end of the tree still uncut, and then extend assembly 23 with its tree for a second delimbing passthrough. This is time consuming, since one stroke is not being utilized for delimbing. Furthermore, more than two delimbing strokes may be desirable. An aspect of the present invention solves this problem. Referring to FIGS. 6 and 7, the inner edge of each double-jointed grab jaw 30, 31 is provided with an arcuate sleeve-like dual-segment cutting or stripper blade member 50 having separate spaced respective fore and aft sharp cutting edges 51 and 52 for delimbing contact with tree 22. When grab jaw assembly 23 extends outwardly, the inner cutting edge 51 strips off the unwanted limbs to provide a first delimbing stroke. If this isn't sufficient to remove the limbs, jaw assembly 23 is then retracted inwardly with the tree, at which time outer cutting edge 52 further strips the limbs in a second delimbing stroke. Returning assembly 23 to its outer position for final log segment cutoff causes inner cutting edge 51 to again perform a delimbing function in yet a third delimbing stroke. There is thus provided continuous delimbing of a tree trunk during reciprocating reversing multiple stroke motion thereof, and prior to final cutoff.

If desired, means may be provided to firmly old a first tree 22 in place against one side of the jaws in harvester 3 during initial pickup, while jaw assemblies 23 and 29 open and close about a second or even third tree during gathering of multiple trees during one operation. For this purpose, and as best shown in FIGS. 2 and 4, at least one accumulator finger 53 is mounted adjacent the throat of pocket 36 and is pivotally actuatable as by a controllable hydraulic cylinder 54 to pivot into pocket 36 to force the initially picked-up tree or trees against one side of the jaws of assemblies 23 and 29, and hold it there, so that the jaws may be opened to receive another tree.

Various modes of carrying out the invention are contemplated as being within the scope of the following claims particularly pointing out and distinctly claiming the subject matter which is regarded as the invention.

We claim:

1. A tree harvesting device (3) adapted for connection on a generally horizontal longitudinal common axis (8) to a self-propelled steerable vehicle (2), said device comprising, in combination:
   (a) a harvester frame (11) mounted for controlled pivoting about a longitudinal pivot axis (13) between a first tree pickup position (FIGS. 1, 2) and a second tree processing position (FIGS. 3, 4),
   (b) a controllable extendable-retractable boom (15) mounted to said frame and with said boom being pivotable with the latter between vertical and transverse horizontal boom positions when said frame pivots between its respective first and second positions,
   (c) a grab jaw assembly (23) mounted to the outer end of said boom and with said assembly including controlled grab jaws (24, 25) for engaging the trunk of a tree (22),
   (d) a delimber jaw assembly (29) mounted to said frame inwardly of said grab jaw assembly and with said delimber jaw assembly including controlled delimber jaws (30, 31) for engaging the trunk of a tree (22),
   (e) an elongated saw (39) mounted to said frame outwardly of said delimber jaw assembly and with said saw being controllably pivotable between a normal retracted position and an extended tree cutting position,
   (f) and said frame and jaw assemblies forming a tree receiving pocket (36) which faces transversely of said common axis forwardly of the vehicle when said frame is in said first position so that selective vehicle steering causes said pocket to approach a tree sideways ahead of the vehicle for enveloping the tree for holding engagement of the tree by said jaw assemblies.

2. The device of claim 1 wherein the construction is such that:
   (a) when said boom (15) is in said vertical position, said saw (39) is controllably extendable horizontally to cut a tree from its base,
   (b) and when said boom is pivoted to said horizontal position:
      (1) said boom is controllably extendable transversely with said grab jaw assembly (23) to pull the tree through said delimber jaw assembly (29) to strip limbs from the tree,
      (2) and said saw is controllably extendable vertically to sever a delimbed tree portion into a separate log segment (44).

3. The tree harvesting device of claim 2 in which, when said frame (11) is in said second position:
   (a) upon extension of said boom (15) transversely, limbs stripped from a tree by said delimber jaw assembly (29) fall downwardly in a transversely extending pile on one side of and ahead of the vehicle,
   (b) and upon controlled extension of said saw (39), the severed log segment (44) falls downwardly so that it extends transversely on the other side of and ahead of the vehicle.

4. The device of claim 3 which includes an open sided protective housing (38) for said saw (39).

5. The device of claim 4 in which:
   (a) said saw (39) is elongated and assumes a vertical position when said frame (11) is in said second tree processing position,
   (b) and said saw is mounted at its lower end for controlled movement about a pivot axis (42).

6. The device of claim 5 wherein said last-named pivot axis (42) is disposed at a level below said grab jaws (24, 25), said delimber jaws (30, 31) and said tree receiving pocket (36) when said frame (11) is in said second tree processing position.

7. The device of claim 6 in which the construction is such that controlled vertical pivoting of said saw (39) when said frame (11) is in said second tree processing position forms a generally vertical elongated arcuate segment (45) on the side of the trunk of the tree, said last-named segment being the last portion of the tree body to be cut before final severing thereof to reduce tearing of the tree body.

8. The device of claim 7 which includes means (46) pivotally mounting one of said grab jaws (25) for free rocking movement (FIGS. 8, 10) so that multiple trees (22, 22a) may be accommodated by said grab jaw assembly.

9. The device of claim 8 which includes means (50-52) associated with said delimber jaws (30, 31) for stripping limbs from a tree (22) during both controlled extension and retraction of said boom (15).

10. The device of claim 9 wherein said stripping means comprises:
    (a) an arcuate stripper blade member (50) mounted to said delimber jaws (30, 31),
    (b) and spaced fore and aft cutting edges (51, 52) disposed on said blade member for engagement with a tree during both directions of boom movement.

11. The device of claim 10 which includes controllably pivotable accumulator means (53) for holding a tree in said jaw assemblies (23, 29) when said grab jaws (24, 25) and delimber jaws (30, 31) are open.

12. A tree harvesting device (3) adapted for connection on a generally horizontal longitudinal common axis (8) to a self-propelled steerable vehicle (2), said device comprising, in combination:
    (a) a harvester frame (11) mounted for controlled pivoting about a longitudinal pivot axis (13) between a first tree pickup position (FIGS. 1, 2) and a second tree processing position (FIGS. 3, 4),
    (b) a controllable extendable-retractable boom (15) mounted to said frame and with said boom being pivotable with the latter between vertical and transverse horizontal boom positions when said frame pivots between its respective first and second positions,
    (c) a grab jaw assembly (23) mounted to the outer end of said boom and with said assembly including controlled grab jaws (24, 25) for engaging the trunk of a tree (22),
    (d) a delimber jaw assembly (29) mounted to said frame inwardly of said grab jaw assembly and with said delimber jaw assembly including controlled delimber jaws (30, 31) for engaging the trunk of a tree (22),
    (e) an elongated saw (39) mounted to said frame outwardly of said delimber jaw assembly and with said saw being controllably pivotable between a normal retracted position and an extended tree cutting position,
    (f) said saw (39) being elongated and assuming a generally vertical position when said frame (11) is in said second tree processing position,
    (g) and said saw being mounted at its lower end for controlled movement about a pivot axis (42),
    (h) said last-named pivot axis (42) being disposed at a level below said grab jaws (24, 25), and said delimber jaws (30, 31) when said frame (11) is in said second tree processing position.

13. A tree harvesting device (3) adapted for connection on a generally horizontal longitudinal common axis (8) to a self-propelled steerable vehicle (2), said device comprising, in combination:
    (a) a harvester frame (11) mounted for controlled pivoting about a longitudinal pivot axis (13) between a first tree pickup position (FIGS. 1, 2) and a second tree processing position (FIGS. 3, 4),
    (b) a controllable extendable-retractable boom (15) mounted to said frame and with said boom being pivotable with the latter between vertical and transverse horizontal boom positions when said frame pivots between its respective first and second positions,
    (c) a grab jaw assembly (23) mounted to the outer end of said boom and with said assembly including controlled grab jaws (24, 25) for engaging the trunk of a tree (22),
    (d) a delimber jaw assembly (29) mounted to said frame inwardly of said grab jaw assembly and with said delimber jaw assembly including controlled delimber jaws (30, 31) for engaging the trunk of a tree (22),
    (e) an elongated saw (39) mounted to said frame outwardly of said delimber jaw assembly and with said saw being controllably pivotable between a normal retracted position and an extended tree cutting position,
    (f) said saw (39) being elongated and assuming a generally vertical position when said frame (11) is in said second tree processing position,
    (g) and said saw being mounted at its lower end for controlled movement about a pivot axis (42),
    (h) an arcuate stripper blade member (50) mounted to said delimber jaws (30, 31),
    (i) and spaced fore and aft cutting edges (51, 52) disposed on said blade member for engagement with a tree during both directions of boom movement.

14. A tree harvesting device (3) adapted for connection on a generally horizontal longitudinal common axis (8) to a self-propelled steerable vehicle (2), said device comprising, in combination:
    (a) a harvester frame (11) mounted for controlled pivoting about a longitudinal pivot axis (13) between a first tree pickup position (FIGS. 1, 2) and a second tree processing position (FIGS. 3, 4),
    (b) a controllable extendable-retractable boom (15) mounted to said frame and with said boom being pivotable with the latter between vertical and transverse horizontal boom positions when said frame pivots between its respective first and second positions,
    (c) a grab jaw assembly (23) mounted to the outer end of said boom and with said assembly including controlled grab jaws (24, 25) for engaging the trunk of a tree (22), (d) a delimber jaw assembly (29) mounted to said frame inwardly of said grab jaw assembly and with said delimber jaw assembly including controlled delimber jaws (30, 31) for engaging the trunk of a tree (22), (e) an elongated saw (39) mounted to said frame outwardly of said delimber jaw assembly and with said saw being controllably pivotable between a normal retracted position and an extended tree cutting position, (f) said saw (39) being elongated and assuming a generally vertical position when said frame (11) is in said second tree processing position, (g) and said saw being mounted at its lower end for controlled movement about a pivot axis (42), (h) and controllably pivotable accumulator means (53) for holding a tree in said jaw assemblies (23, 29) when said grab jaws (24, 25) and delimber jaws (30, 31) are open.

15. A method of harvesting a tree, comprising the steps of:
  (a) providing:
    (1) a harvester frame (11) at the front end of a self-propelled steerable vehicle (2) so that said frame and vehicle are on a longitudinal common axis (8),
    (2) and a transversely extending pocket (36) associated with said frame,
  (b) propelling said vehicle into a wooded area and toward the side of a tree to be harvested,
  (c) swinging said harvester frame sideways toward said tree transversely of said axis to cause said pocket to envelope said tree forwardly of said vehicle,
  (d) and cutting said tree from its base.

16. The method of claim 15 which includes the further steps of:
  (a) tipping said cut tree to a horizontal position transversely of said axis,
  (b) delimbing said tipped tree so that limbs removed from the tree fall to the ground in a transverse pile on one side of and forwardly of the vehicle,
  (c) and severing a portion of said tipped tree so that a log segment is formed which falls to the ground in a transverse position on the other side of and forwardly of the vehicle.

17. The method of claim 15 in which said delimbing step includes:
  (a) providing first and second spaced limb cutting edges (51, 52),
  (b) moving said tree along the first of said cutting edges to provide a first delimbing operation,
  (c) and reversing the movement of said tree so that said second of said cutting edges provides a second delimbing operation.

* * * * *